United States Patent
Nelson

(10) Patent No.: US 7,096,339 B2
(45) Date of Patent: Aug. 22, 2006

(54) SYSTEM AND METHOD FOR DETECTING MEMORY MANAGEMENT PROGRAMMING ERRORS

(75) Inventor: Kenneth Carlin Nelson, Hollister, CA (US)

(73) Assignee: International Business Machines Corporation, Armonk, NY (US)

(*) Notice: Subject to any disclaimer, the term of this patent is extended or adjusted under 35 U.S.C. 154(b) by 436 days.

(21) Appl. No.: 10/378,192

(22) Filed: Mar. 1, 2003

(65) Prior Publication Data

US 2004/0172513 A1    Sep. 2, 2004

(51) Int. Cl.
*G06F 12/00* (2006.01)

(52) U.S. Cl. ............... 711/170; 711/154; 711/159

(58) Field of Classification Search ............... 711/100, 711/154, 159, 170, 171; 714/28, 48; 717/100, 717/141
See application file for complete search history.

(56) References Cited

U.S. PATENT DOCUMENTS

| | | | |
|---|---|---|---|
| 4,121,286 A | 10/1978 | Venton et al. | 364/200 |
| 4,912,629 A | 3/1990 | Shuler, Jr. | 364/200 |
| 5,321,834 A | 6/1994 | Weiser et al. | 395/600 |
| 5,335,344 A * | 8/1994 | Hastings | 714/35 |
| 5,454,096 A | 9/1995 | Otsuka et al. | 395/401 |
| 5,522,036 A * | 5/1996 | Shapiro | 714/38 |
| 6,206,584 B1 | 3/2001 | Hastings | 395/183.11 |
| 6,360,233 B1 | 3/2002 | Houldsworth | 707/206 |
| 6,363,467 B1 * | 3/2002 | Weeks | 711/170 |
| 6,381,738 B1 | 4/2002 | Choi et al. | 717/8 |
| 6,718,485 B1 * | 4/2004 | Reiser | 714/38 |
| 2002/0035676 A1 * | 3/2002 | Weeks | 711/170 |

* cited by examiner

*Primary Examiner*—Tuan V. Thai
(74) *Attorney, Agent, or Firm*—Samuel A. Kassatly

(57) ABSTRACT

A memory management functions system enables an efficient memory management programming errors. The system includes a server code that reports detailed trace data showing memory management calls; memory that was allocated but not freed; memory requested to be freed that was not allocated; corrupted memory immediately following the allocated space; and incorrect exit from a stored procedure that bypasses reporting and memory cleanup. In addition, the present system frees on exit, memory leaks or memories that were allocated but not explicitly freed earlier. These features allow a programmer to more readily easily detect and debug memory management errors within their program code.

30 Claims, 6 Drawing Sheets

SYSTEM AND METHOD FOR DETECTING MEMORY MANAGEMENT PROGRAMMING ERRORS

FIELD OF THE INVENTION

The present invention generally relates to memory management in computer programming, and more specifically to the automatic conversion of the malloc, free, calloc, and realloc functions to enable the detection of programming errors that would have been otherwise very difficult to locate and fix.

BACKGROUND OF THE INVENTION

Memory management is critical to the proper operation of computer programs. Failure to free memory results in "leaks" or ever-increasing use of memory until eventually the application will malfunction or fail. In addition, the performance of other applications on the computer will be affected as available memory is squandered.

Programs written in languages such as C or C++, have no memory intelligence. For example, C programs do not automatically free memory until the application is completed. At times, an application may run for weeks or even months; an error created by a failure to free memory may not surface until a long time after the error was introduced.

Java® provides much more intelligence with respect to memory in its programming capabilities, but programmers still make errors at times in managing memory functions within their program code. Finding and correcting such an error is tedious and time consuming for programmers.

Numerous approaches have been proposed to solve this problem. For example, JAVA® removes responsibility for memory management through the use of "garbage collection," but improperly written applications could still cause leaks. Run-time tools to analyze use of memory are sometimes employed, tracking memory that is allocated and freed, then reporting memory still remaining.

Application writers often keep a list of allocated memory for their function then free the allocated memory on exit. In some cases, a "memory manager" is implemented for use across an application. While these approaches can help to track and report allocations and their matching calls to free the memory, it is still up to the application programmer to build the test cases to prove that all leaks are eliminated.

Another problem related to proper memory management is freeing only the memory that has been allocated. In some cases, memory corruption can result if an application calls the "free" function, and then passes an address that has not been allocated or that has already been freed. This memory corruption can be very difficult to debug because the symptom does not appear until long after the error cause.

Another memory management problem is caused if an application allocates space to contain "n" bytes but then stores "n+1" or more bytes into that space. This is generally called memory corruption. The data following the allocated space can sometimes be critical to proper execution of the program. However, any symptom of this error will not be detected until that data is used. Detection of this error is commonly supported by compilers, but requires additional calls to be inserted into the code and is only operational with a "debug" build.

Memory management solutions typically depend on the application programmer to either write perfect code (at least in the area of memory management), or to diagnose problems after the code is written then correct the code one case at a time. This approach can never be proven to eliminate all leaks.

What is therefore needed is a method for removing the burden of detecting memory management errors from the program developer and for providing documentation for memory management functions and their performance within the program developer's code. The need for such a system has heretofore remained unsatisfied.

SUMMARY OF THE INVENTION

The present invention satisfies this need, and presents a system, a computer program product, and an associated method (collectively referred to herein as "the system" or "the present system") for detecting memory management programming errors. The present system removes the burden of diagnosing memory management errors from the developer, providing a powerful diagnostic tool that allows developers to create programming code that can be free of memory leaks and other errors caused by incorrect memory management. Any software written in C that manages memory for a short period of time, and that expects all memory to be freed at an identifiable exit point could use the present system. All current and future library server functions could take advantage of the new memory management capability provided by the present system.

A typical application of the present system would be in a system such as a content management system. The advantage of the present system is that the server code of the content manager will report:

1) Detailed trace data showing memory management calls.
2) Memory that was allocated but not freed.
3) Memory requested to be freed that was not allocated.
4) Corrupting memory immediately following the allocated space.
5) Incorrect exit from a stored procedure that bypasses reporting and memory cleanup.

In addition, the present system frees on exit any memory that was allocated but not explicitly freed earlier. These features allow a programmer to easily detect and debug memory management errors within their program code.

The present system replaces four functions typically used to manage memory in programming languages such as C/C++, with new functions containing additional memory management capabilities. The present system replaces the programming functions malloc, free, calloc, and realloc with functions having, preferably similar or identical names.

The malloc function provides a mechanism to the programmer for obtaining memory for a program. For example, when the programmer loads a file, memory is needed to hold the file content. The calloc function is identical to malloc, except that memory is initialized. The realloc function is used to increase the size of allocated memory that was obtained by malloc or calloc. The free function frees memory reserved by the malloc function. Each malloc or calloc function requires a corresponding free function to release memory.

When either the malloc function (also referred to herein as "malloc") or the calloc (also referred to herein as "calloc") function is called, the required memory is allocated and an entry is added to a list of allocations with the address, size, name of the function which called malloc or free, and the line number within that function. If memory tracing is active, this information is written to the server log. When realloc (also referred to herein as "realloc") is called, the C realloc function is called to extend the memory and the list is updated with the new size, function name, and line number.

To help eliminate memory corruption, the present system can be operated in a memory debug mode, specified as a system trace level. When running with memory debug active, a "barrier" is added to the end of the allocated space and initialized with a recognizable pattern. On every call to one of the memory management functions, this barrier space is checked to see if any bytes have been changed. If so, an error message is written to the server log. The developer will know that the error was caused between the two previous records written to the log.

When the free function (also referred to herein as "free") is called, the address is located in the list, the memory is freed, and the list is updated to show the memory is no longer allocated. If the address is not contained in the list, an error is written to the library server log indicating that memory is being freed that was not allocated by the program memory manager.

To ensure good performance in locating memory in the list, the functions implementing malloc, calloc, and realloc store an "index" of the list in the 4 bytes before the address that is returned to the calling function. When a function such as free is called, the index value is extracted. Consequently, it is not necessary to search the list, reducing processing time in finding the correct line in many thousands of lines. To help detect memory corruption or other errors, the size of the allocated space is stored 8 bytes before the address returned to the calling function. If the size of the allocated space does not match the size recorded in the list, an error is written to the library server log.

Reporting memory leak, or memory that was allocated but not freed, is accomplished by one of two methods. The first method uses the common exit function. Every stored procedure on the library server is expected to call a common exit function before ending. This exit function processes the list of memory allocations.

If the trace function is active, the exit function writes details (function name, line number, size) of any remaining allocations to the library server log then frees the memory to ensure there are no leaks. The developer can use this information to free the memory earlier in the stored procedure or can conclude that freeing the memory on exit is appropriate.

The second method exploits the behavior of DB2 stored procedures which uses a persistent process for a database connection. There are cases, such as in an error path, where the stored procedure does not properly call the common exit function.

A global static variable is created that points to the memory management structure. This value is set to zero on a "normal" exit. During initialization of each stored procedure, if this value is not zero an error is written to the library server log showing the name of the previously called stored procedure. The developer can use this information to insert the correct call to the common exit function.

BRIEF DESCRIPTION OF THE DRAWINGS

The various features of the present invention and the manner of attaining them will be described in greater detail with reference to the following description, claims, and drawings, wherein reference numerals are reused, where appropriate, to indicate a correspondence between the referenced items, and wherein:

DETAILED DESCRIPTION OF PREFERRED EMBODIMENTS

The following definitions and explanations provide background information pertaining to the technical field of the present invention, and are intended to facilitate the understanding of the present invention without limiting its scope:

API: Application Program Interface, a language and message format used by an application program to communicate with the operating system or some other control program such as a database management system (DBMS) or communications protocol.

C/C++: C is a high-level programming language that is able to manipulate the computer at a low level like assembly language. C++ is an object-oriented version of C that has been widely used to develop enterprise and commercial applications. C and C++ are written as a series of functions that call each other for processing. The body of the program is a function named "main." Functions are flexible, allowing programmers to choose from the standard library that comes with the compiler, to use third party libraries or to develop their own libraries.

Figure 1:
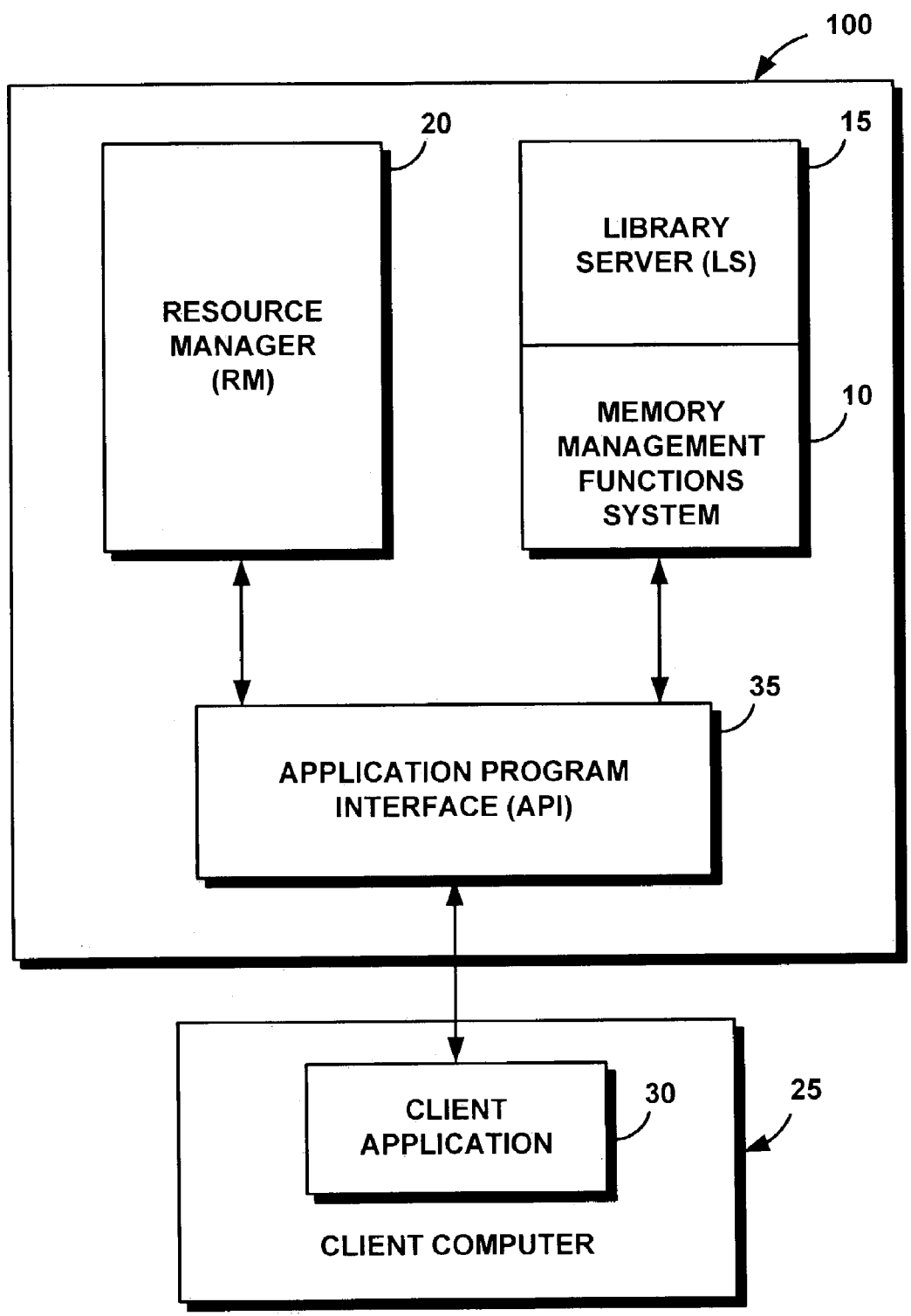
FIG. 1 is a high level block diagram of a content management system in which an memory management error detection system of the present invention can be used.

FIG. 1 illustrates an exemplary content management system 100 comprising a memory management functions system 10 installed in a library server or a compiler 15. In addition, content management system 100 comprises resource manager 20 and application programming interface 35. The memory management functions system 10 includes a software programming code or computer program product that is typically embedded within, or installed on a computer.

A client computer 25 including a client application 30, is coupled to content management system 100 via the application program interface (API) 35. Upon receipt of a call for any one or more of the following functions: malloc, free, calloc, or realloc, these calls are replaced by a compiler with new corresponding functions in the memory management functions system 10. The new functions are denoted with a prefix ICM, to distinguish them from the corresponding original function.

As an example, the commands used to replace each of these four functions are listed below:

define malloc(size)
ICMmalloc(file, line, size, . . . ), wherein malloc is replaced with ICMmalloc.

```
# define free(address)
    ICMfree(file, line, address), wherein free is replaced with
ICMfree.

# define realloc(address,size)
    ICMrelloc(file, line, address,size), wherein realloc is
replaced with ICMrealloc.

# define calloc(size)
    ICMcalloc(file, line, size, . . . ), wherein calloc is replaced
with ICMcalloc.
```

Figure 2:
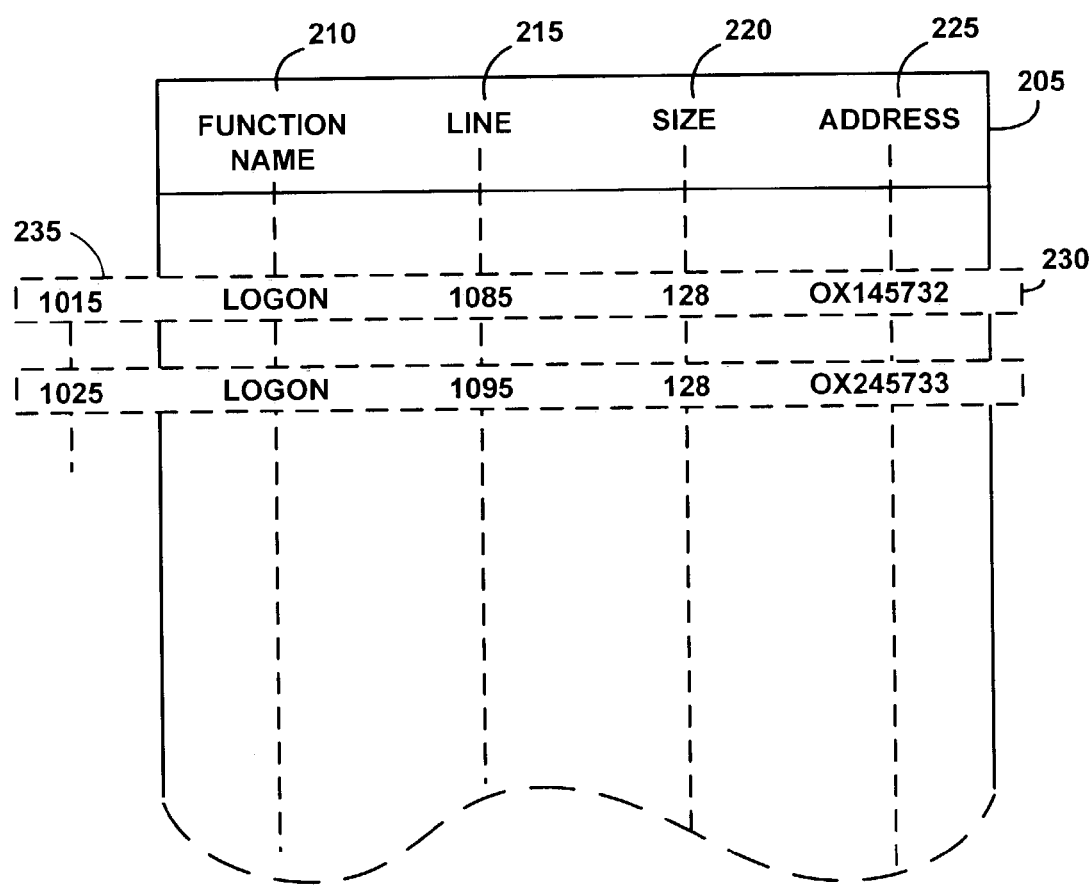
FIG. 2 is a representation of a memory table created by the memory management error detection system of FIG. 1.

The library server 15 builds a table 205 of all the allocated memory, as exemplified by FIG. 2. When ICMmalloc is called, the library server 15 records the function name 210 that called ICMmalloc in addition to the line number 215, the allocated size 220, and the actual address 225 of the memory. An exemplary record 230, where the function that called malloc was "logon", at line 1085, requesting 128 bytes, at address OX145732. In actual performance, table 205 that is created by the library server 15, may contain several hundreds or thousands of records.

In addition, in a preferred embodiment, the memory management functions system 10 inserts an index 235 stored at the beginning of the memory block. The index 235 could represent a row number of the record 235. This feature of the memory management functions system 10 allows faster access of memory records. For example, in a situation where table 205 contains thousands of records, and the free function is called, conventionally, the only information that would be passed to the free function was the address. This required the free function to search each line (or record, e.g., record 230) for the address, slowing down the overall systemic performance.

Figure 3:
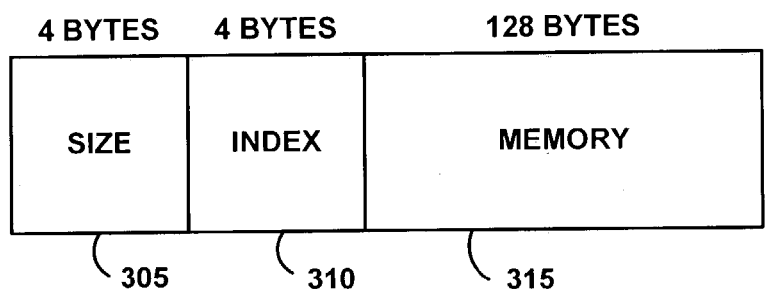
FIG. 3 is a block diagram representing a memory block allocated by memory management error detection system of FIG. 1.
Figure 6:
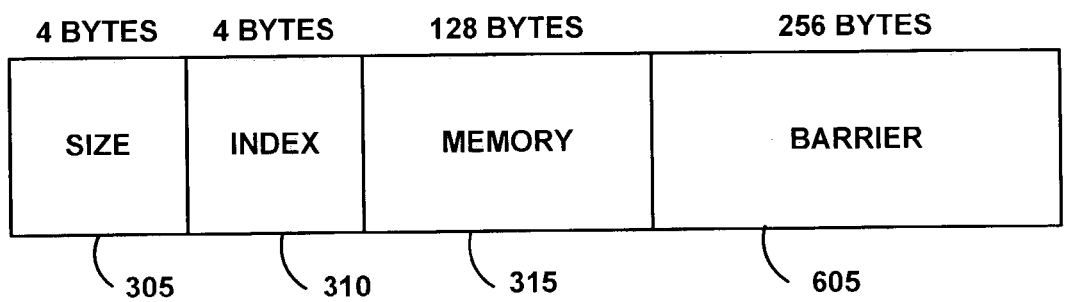
FIG. 6 is a block diagram representing a memory block with barrier used for debugging purposes by the memory management error detection system of FIG. 1.

The memory management functions system 10 of the present invention adds 8 bytes to each memory block 300 reserved by ICMmalloc, as shown by FIGS. 3 and 6. Of these 8 bytes, 4 bytes are allocated for the size record 305, and the other 4 bytes are allocated for the table index 235 in an index record 310. When used with a 64 bit operating system, the address field will be extended to 8 bytes. When the free function is called, the index value is extracted and used to find the record in the table in FIG. 2, e.g., record 230.

In a situation where memory is freed, system 10 initializes the size 220 and the address 225 to zero, but leaves the index record 230 intact, until the application is exited. In addition, the memory at the location specified in the call to free is returned to the operating system. The record 230 may be used to record a reference to allocated memory by a future call to malloc or calload. When the application is exited, the library server 15 frees the table in FIG. 2.

If tracing has been requested, The library server 15 then records in the system log the call to the free function and the address that was freed.

The calloc function is replaced with ICMcalloc by library server 15. ICMcalloc is generally similar to ICMmalloc, except that it initializes the memory at address 225 to zero. As for the ICMmalloc function, library server 15 then adds a record to the table 205.

The realloc function is replaced with the ICMrealloc function by library server 15. ICMrealloc reallocates memory at the specified address 225, adding memory to that address 225. For example, a prior call may have allocated 100 bytes to address A:
    A=malloc(100).

ICMrealloc is used to increase the memory at address A to, for example, 500 bytes:
    A=realloc(A,500).

Primarily, two memory errors occur with the use of the free function. The first error occurs if the programmer forgets to add a free function call to free memory allocated by a malloc function call. The second memory error occurs if the programmer attempts to free memory at an address which has not been allocated, or which has allready been freed.

Figure 4:
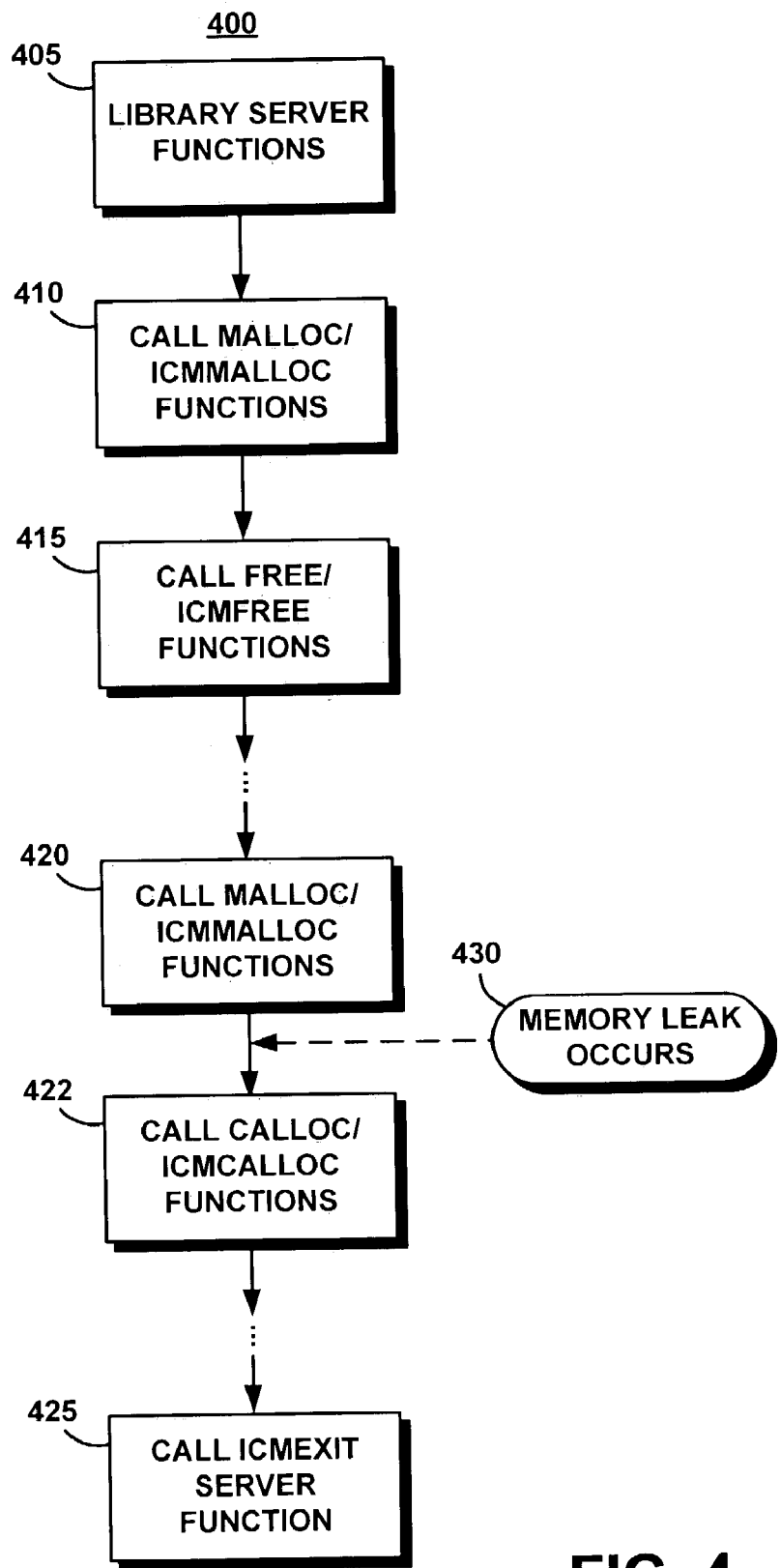
FIG. 4 is an exemplary process flow chart that illustrates a method of "plugging" memory leaks according to the present invention.

The memory management functions system 10 addresses the first memory error by adding memory management functionality to functions such as exit server function, as illustrated by process 400 of FIG. 4. A memory leak occurs if memory is allocated by a malloc or ICMmalloc call but not released by a free call.

A function of the library server 15 such as logon is called at block 405. The function logon calls the malloc function at block 410. The compiler replaces the malloc(size) function with an ICMmalloc(size) function, and allocates a block of memory to the requested size. In this example, several functions are called subsequent to the malloc call at block 410.

The user program then calls the free(address) function at block 415. In response, the library server 15 calls ICMfree (address) function, and frees the memory at the specified address. Several functions are called subsequent to the free call at block 415. The user program then calls a function that requests memory, such as the malloc(size) function at block 420. The library server 15 calls ICMmalloc(size, . . . ) function, and allocates a block of memory of the requested size. Several functions are called subsequent to the malloc function (block 420).

The user program then calls an exit server function, such as the ICM exit server function, to exit the program. Since the memory allocated at block 420 has not been freed, this would create a memory leak as shown by block 430. The memory management functions system 10 adds new functionality to the exit server function (block 425). The ICM exit server function (block 425) reads table 205 of the allocated memory, and reports any leak, that is memory which has been allocated by not freed, to the library server log with an appropriate message. The ICM exit server function (block 425) then frees the memory to eliminate the memory leak (block 430).

The ICM exit server function at block 425, provides a parity or error check for the call functions, such as the four exemplary functions discussed herein, reporting memory leaks to the library server 15 under many different conditions. The library server 15, in turn, records these error messages in the library server log.

However, in the present exemplary scenario, the programmer may forget to add the function ICM exit server to the programming code. This error could potentially cripple the ability of the library server 15 in conjunction with the memory management functions system 10 to capture and record memory errors within the program.

To solve this problem, additional functionality is added to predetermined stored procedures such as "create doc". When these predetermined stored procedures are called, the library server 15 accesses a static variable which contains the address of the memory management table. If that variable contains a valid address, then a message such as "logon did not exit normally" to the library server log. This enables the programmer to identify and correct the error and free the memory in the programming code.

Figure 5:
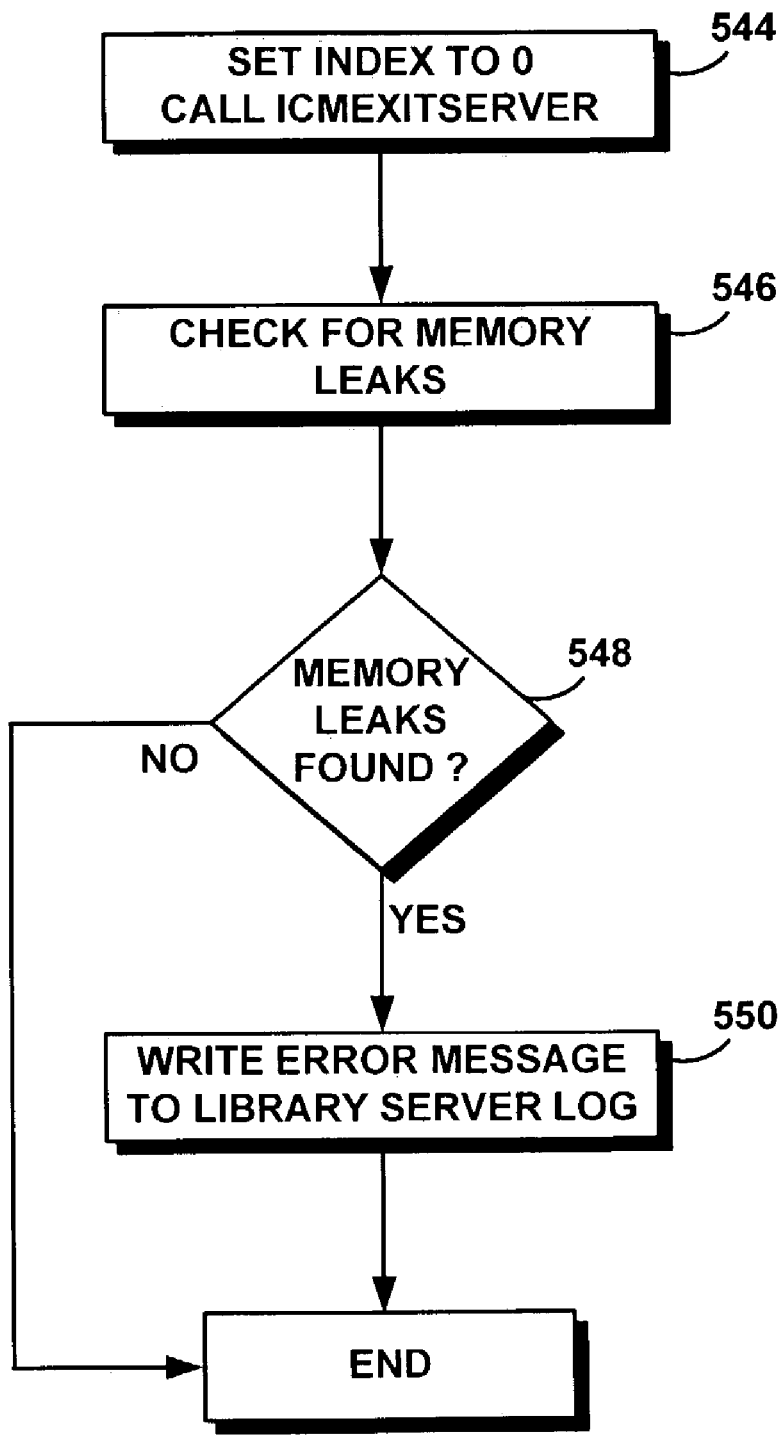
FIG. 5 is a process flow chart that illustrates an ICMExitServer function.

With reference to FIG. 5, additional functionality has been added to the stored procedures for a method 500 to check for memory leaks that may have occurred while a program is operating. When the exit server (ICMExitServer) function is called at block 544, method 500 sets the index to zero, and checks each allocation record 230. If the address 225 at the record(index) is not zero, then the memory at that location is determined at block 548 not to have been freed. The library server 15 writes an appropriate error message to the library server log for the programmer to use in locating the source of the memory leak and frees the memory, thus preventing the memory leak.

The functionality of the memory management functions system 10 provides a powerful debugging feature for programmers. On occasion, a programmer may accidentally attempt to store more data in a memory block than the memory block will hold. This error is very difficult to find, especially in programs written in C/C++. For debugging purposes, the system administrator can configure library server so that the ICMmalloc function will allocate additional memory in a "barrier". In this situation, an ICMmalloc function call allocates memory as shown in FIG. 6.

The memory block 600 now contains additional memory in the form of a memory barrier 605. As before, the memory block 600 also contains the size 305, index 310, and allocated memory 315. The barrier 605 is set to a recognizable value, and is allocated, for example, 256 bytes.

The programmer then runs the program as before. If the program attempts to store more data in the memory block than is allocated, the data spills over into the barrier 605, overwriting the barrier 605. On every call to one of the memory management functions, this barrier 605 is checked to see if any bytes have been changed. If so, an error message is written to the server log. The developer will know that the error was caused between the two previous records written to the log. This technique is generally reserved for debugging, as it could become relatively expensive in terms of memory and processing time.

Figure 7:
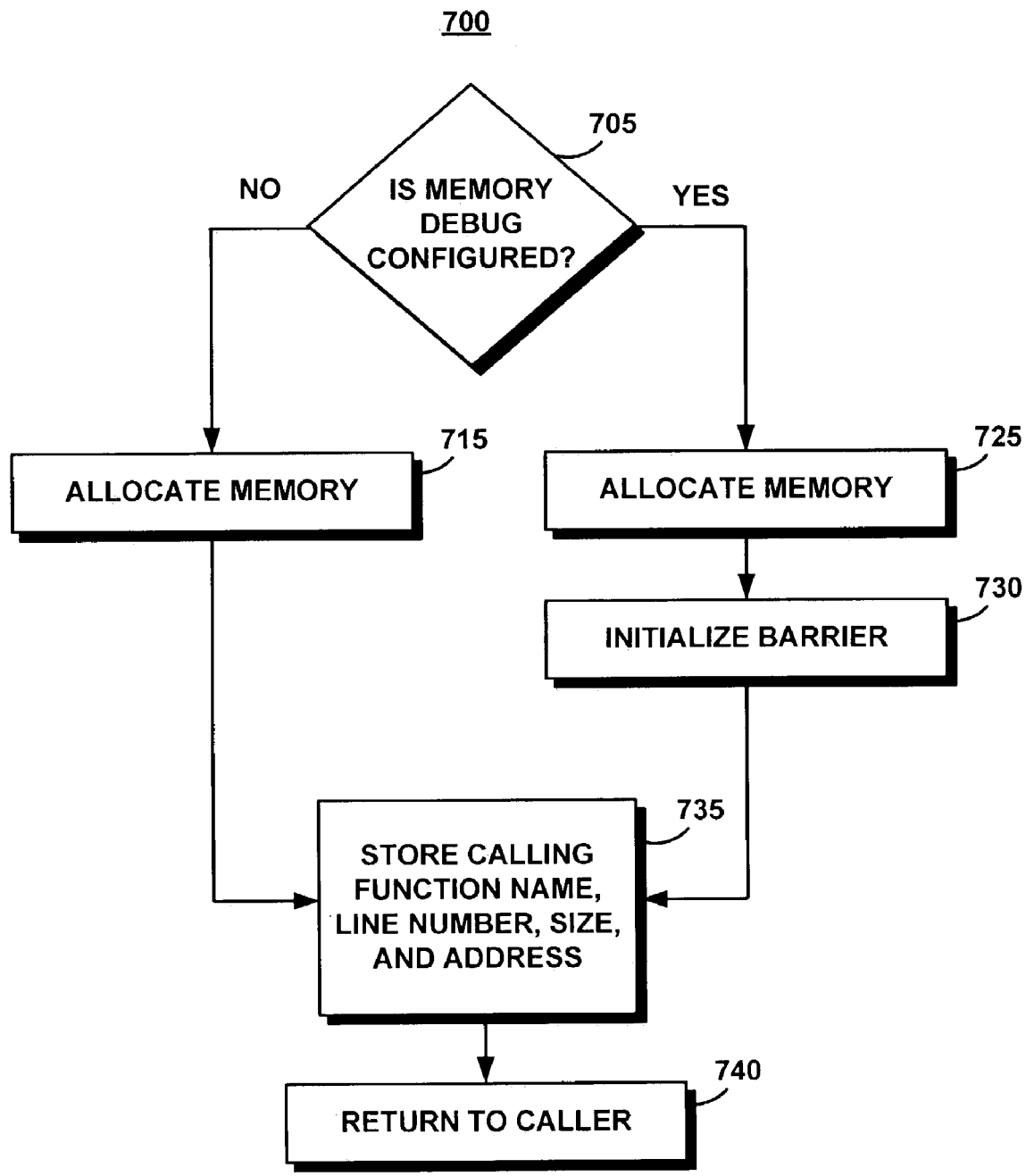
FIG. 7 represents a process flow chart illustrating a method of operation of the debugging through memory barrier feature of the memory management error detection system of FIG. 1.

A method of operation 700 of memory management functions system 10 using barriers during a program debugging operation is illustrated in the process flow chart of FIG. 7. At block 705, method 700 inquires if memory debug has been configured by the system administrator. If it has, method 700 allocates memory at block 725. In this embodiment, the memory that is allocated, or needed is equal to the memory size that is requested plus 8 bytes plus 256 bytes, as shown in FIG. 6. Method 700 then initializes a barrier 605 at block 730.

If at decision block 705 method 700 determines that memory debug has not been configured, it allocates memory at block 715. In this embodiment, the memory that is allocated, or needed is equal to the memory size that is requested plus 8 bytes, as shown in FIG. 3.

Method 700 then stores, at block 735, the calling function name, the line number, the size, and the address in a table. Size is stored at the beginning of the memory; the index is stored at the beginning of the memory plus 4 bytes; and the address is set to return as the beginning memory plus 8 bytes. Method 700 then returns to the calling function at block 740.

It is to be understood that the specific embodiments of the invention that have been described are merely illustrative of certain application of the principle of the present invention. Numerous modifications may be made to the system and method for memory detecting memory management programming errors invention described herein without departing from the spirit and scope of the present invention.

What is claimed is:

1. A method for detecting memory management programming errors, comprising:

a calling function requesting a first memory function;

replacing the first memory function with a replacement first memory function when the first memory function is detected;

the replacement first memory function allocating a memory required by the first memory function;

the replacement first memory function further adding a record to a list of allocations, wherein the entry comprises an address, memory size, a name of the calling function, and a line number of the calling function;

wherein the first memory function is a malloc function;

wherein the replacement first memory function is an ICMmalloc function; and wherein replacing the ICMcalloc function is implemented by adding a calloc record entry to the list of allocations, wherein the calloc record entry comprises an address, a memory size that is initialized to zero, a name of the calling function, and a line number of the calling function.

2. The method of claim 1, further comprising detecting a free memory function.

3. The method of claim 2, further comprising replacing the free memory function with a replacement free memory function when the free memory function is called.

4. The method of claim 3, wherein the replacement free memory function initializes the record.

5. The method of claim 4, further comprising deleting the record that has been initialized when an exit function is called.

6. The method of claim 5, further comprising replacing a second memory function with a replacement second memory function when the second memory function is detected.

7. The method of claim 6, wherein the second memory function is a reolloc function.

8. The method of claim 7, wherein the replacement second memory function is referred to as ICMrealloc function.

9. The method of claim 1, further comprising checking a parity of any of the malloc, free, realloc, or calloc functions when the exit server is called.

10. The method of claim 1, further comprising adding a memory barrier to a memory block of the memory, in order to detect memory overwrites.

11. The method of claim 10, wherein the ICMmalloc function adds 8 bytes to the memory dock.

12. The method of claim 11, further comprising dedicating 4 bytes of the memory dock for the memory size.

13. The method of claim 12, further comprising dedicating 4 bytes of the memory block for an index for the location of the memory block in the record.

14. The method of claim 13, wherein the replacement free memory is referred to as ICMfree function.

15. The method of claim 14, wherein the ICMfree function uses the index to find the address of a memory leak.

16. The method of claim 15, wherein the ICMcalloc function adds 8 bytes to the memory block.

17. The method of claim 16, further comprising allocating 4 bytes for the memory size.

18. The method of claim 17, further comprising allocating 4 bytes for the index.

19. The method of 1, further comprising specifying a memory barrier size and configuration for memory debugging purpose.

20. The method of claim 19, further comprising comparing the barrier size and configuration to a designated barrier after each memory function is called.

21. The method of claim 20, further comprising sending an error message to a library server log if the barrier size and configuration do not match the designated barrier.

22. A computer program product having executable instruction codes stored on a computer readable medium, for detecting memory management programming errors, comprising:
- a first set of instruction codes for requesting a first memory function;
- a second set of instruction codes for replacing the first memory function with a replacement first memory function when the first memory function is detected;
- wherein the replacement first memory function allocates a memory required by the first memory function;
- wherein the replacement first memory function further adds a record to a list of allocations;
- wherein the entry comprises an address, memory size, a name of the calling function, and a line number of the first set of instruction codes;
- wherein the first memory function is a malloc function;
- wherein the replacement first memory function is an ICMmalloc function; and
- wherein the second set of instruction codes replaces the first memory function with the replacement first memory function by replacing the ICMcalloc function is implemented by adding a calloc record entry to the list of allocations, wherein the calloc record entry comprises an address, a memory size that is initialized to zero, a name of the calling function, and a line number of the calling function.

23. The method of claim 22, further comprising detecting a free memory function.

24. A computer implemented system for detecting memory management programming errors, comprising:
- means for requesting a first memory function;
- means for replacing the first memory function with a replacement first memory function when the first memory function is detected;
- wherein the replacement first memory function allocates a memory required by the first memory function;
- wherein the replacement first memory function further adds a record to a list of allocations;
- wherein the entry comprises an address, memory size, a name of the calling function, and a line number of the first set of instruction codes;
- wherein the first memory function is a malloc function;
- wherein the replacement first memory function is an ICMmalloc function; and
- wherein the replacing means replaces the first memory function with the replacement first memory function by replacing the ICMcalloc function is implemented by adding a calloc record entry to the list of allocations, wherein the callloc record entry comprises an address, a memory size that is initialized to zero, a name of the calling function, and a line number of the calling function.

25. The system of claim 24, further comprising means for checking a parity of any of the malloc, free, realloc, or calloc functions when the exit server is called.

26. The system of claim 24, further comprising means for adding a memory barrier to a memory block of the memory, in order to detect memory over writes.

27. The system of claim 26, wherein the ICMmalloc function adds 8 bytes to the memory block.

28. The system of claim 27, further comprising means for dedicating 4 bytes of the memory block for the memory size.

29. The system of claim 28, further comprising means for dedicating 4 bytes of the memory block for an index for the location of the memory block in the record.

30. The system of 24, further comprising means for specifying a memory barrier size and configuration for memory debugging purpose.

* * * * *